(12) United States Patent
Chen et al.

(10) Patent No.: US 9,009,140 B2
(45) Date of Patent: Apr. 14, 2015

(54) OPTIMIZATION OF DATABASE QUERY

(71) Applicant: SAP AG, Walldorf (DE)

(72) Inventors: Yingyu Chen, Shanghai (CN); Huixin Xu, Shanghai (CN)

(73) Assignee: SAP SE (DE)

( * ) Notice: Subject to any disclaimer, the term of this patent is extended or adjusted under 35 U.S.C. 154(b) by 79 days.

(21) Appl. No.: 13/664,441

(22) Filed: Oct. 31, 2012

(65) Prior Publication Data

US 2014/0095469 A1    Apr. 3, 2014

(30) Foreign Application Priority Data

Sep. 28, 2012    (CN) .......................... 2012 1 0369839

(51) Int. Cl.
  *G06F 17/30*    (2006.01)
(52) U.S. Cl.
  CPC ............................. *G06F 17/30466* (2013.01)
(58) Field of Classification Search
  CPC .................................................. G06F 17/30466
  USPC ........................................................ 707/714
  See application file for complete search history.

(56) References Cited

U.S. PATENT DOCUMENTS 6,470,335 B1 * 10/2002 Marusak ............................... 1/1
2003/0220941 A1 * 11/2003 Arnold et al. .................. 707/200

OTHER PUBLICATIONS

IBM, Join optimization, Jan. 2007.*
MySQL, How MySQL Simplifies Outer Joins, 2005.*
Pilehvar, A new approach to join reordering in query optimization, 2005.*
PostgreSQL, Controlling the Planner with Explicit Join Clauses, 2006.*
Sybase, Conversion of outer joins to inner joins, 2010.*
Yu, Migrating Database Content from SQL Server to SAP HANA, Nov. 2013.*

* cited by examiner

*Primary Examiner* — William Spieler
(74) *Attorney, Agent, or Firm* — Horizon IP Pte. Ltd.

(57) ABSTRACT

Described herein is a technology for facilitating optimization of database queries is described herein. In some implementations, a first query is received. At least one scenario for optimization is automatically recognized by detecting specific syntax in the query. A second query is then automatically generated by re-writing the first query using a pre-defined operation corresponding to the recognized scenario.

20 Claims, 5 Drawing Sheets

OPTIMIZATION OF DATABASE QUERY

TECHNICAL FIELD

The present disclosure relates generally to databases and more specifically to database query optimization.

BACKGROUND

A database typically includes one or more database tables for storing data values. To retrieve and manipulate the data in the database, a user, application program or a remote system typically issues a database query to a Database Management System (DBMS). A database query refers to a set of statements, commands or clauses that are used to retrieving data stored in the databases. For instance, a query may specify a particular location (e.g., a table, row or column) in a database to retrieve data from, or how to join columns from multiple tables.

The query is compiled before execution. During compilation, the DBMS typically parses the query into relational operators that specify how to implement the query. The relational operators may be ordered in a "query plan" or "access plan." Since there is typically a large number of alternative ways to execute a given query, with widely varying performance, the DBMS' query optimizer may evaluate some of the different possible plans and return what it considers the best query plan.

Since query optimizers are imperfect, database users and administrators sometimes need to manually examine and tune the query plans to achieve better performance. A set of tools (e.g. IBM Visual Explain) are typically provided to display the query access plan. Some databases provide the function "EXPLAIN PLAN" to allow the user to preview and evaluate the query plan generated by the DBMS. A "Plan table" that returns the cost and time for executing the query may also be provided.

However, the EXPLAIN PLAN function is not very helpful in performance tuning. For instance, some databases may return a Plan table with many unknown results (e.g., execution time), making it difficult to judge which query statement yielded the most efficient query plan. In addition, different "join" sequences may result in different query plans that lead to different execution times, which are often unknown.

In addition, manual performance tuning can be extremely time-consuming and difficult. Complex Structured Query Language (SQL) queries may require different tuning methods to be performed. In the likely event of a data volume change, the entire tedious tuning process will have to be repeated to evaluate the change in performance. Moreover, different databases have different properties, and the programmer has to be familiar with the specific properties of the underlying database in order to perform the performance tuning.

Therefore, there is a need for an improved database query optimization framework that addresses the above-mentioned challenges.

SUMMARY

A computer-implemented technology for facilitating optimization of database queries is described herein. In some implementations, a first query is received. At least one scenario for optimization is automatically recognized by detecting specific syntax in the first query. A second query is then automatically generated by re-writing the first query using a pre-defined operation corresponding to the recognized scenario.

With these and other advantages and features that will become hereinafter apparent, further information may be obtained by reference to the following detailed description and appended claims, and to the figures attached hereto.

BRIEF DESCRIPTION OF THE DRAWINGS

Some embodiments are illustrated in the accompanying figures, in which like reference numerals designate like parts, and wherein.

DETAILED DESCRIPTION

In the following description, for purposes of explanation, specific numbers, materials and configurations are set forth in order to provide a thorough understanding of the present frameworks and methods and in order to meet statutory written description, enablement, and best-mode requirements. However, it will be apparent to one skilled in the art that the present frameworks and methods may be practiced without the specific exemplary details. In other instances, well-known features are omitted or simplified to clarify the description of the exemplary implementations of the present framework and methods, and to thereby better explain the present framework and methods. Furthermore, for ease of understanding, certain method steps are delineated as separate steps; however, these separately delineated steps should not be construed as necessarily order dependent in their performance.

The framework described herein may be implemented as a method, computer-controlled apparatus, a computer process, a computing system, or as an article of manufacture such as a computer-usable medium. These and various other features will be apparent from the following description.

Figure 1:
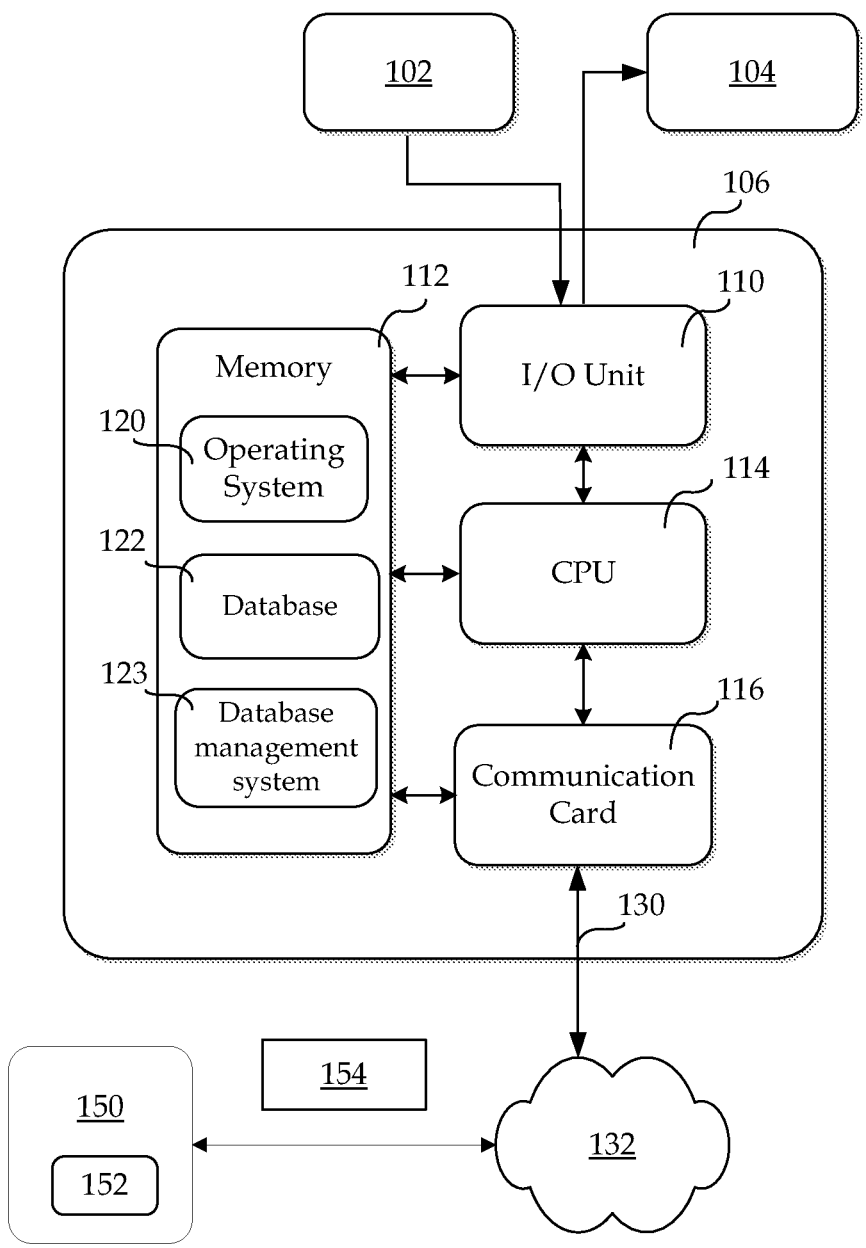
FIG. 1 is a block diagram illustrating an exemplary system.

FIG. 1 shows a block diagram illustrating an exemplary system 100 that may be used to implement the framework described herein. System 100 may include a computer system 106 communicatively coupled to an input device 102 (e.g., keyboard, touchpad, microphone, camera, etc.) and an output device 104 (e.g., display device, monitor, printer, speaker, etc.). Computer system 106 also may include a communications card or device 116 (e.g., a modem and/or a network adapter) for exchanging data with network 132 using a communications link 130 (e.g., a telephone line, a wireless network link, a wired network link, or a cable network). Network 132 may be a local area network (LAN) or a wide area network (WAN). The computer system 106 may be communicatively coupled to one or more other computer systems 154 via network 132. For example, computer system 106 may act as a server and operate in a networked environment using logical connections to one or more client computers 150.

Computer system 106 includes a central processing unit (CPU) 114, an input/output (I/O) unit 110, and a memory module 112. Other support circuits, such as a cache, power supply, clock circuits and a communications bus, may also be included in computer system 106. In addition, any of the foregoing may be supplemented by, or incorporated in, application-specific integrated circuits. Examples of computer system 106 include a handheld device, a mobile device, a personal digital assistance (PDA), a workstation, a server, a portable laptop computer, another portable device, a minicomputer, a mainframe computer, a storage system, a dedicated digital appliance, a device, a component, other equipment, or some combination of these capable of responding to and executing instructions in a defined manner.

Memory module 112 may be any form of non-transitory computer-readable media, including, but not limited to, dynamic random access memory (DRAM), static random access memory (SRAM), Erasable Programmable Read-Only Memory (EPROM), Electrically Erasable Programmable Read-Only Memory (EEPROM), flash memory devices, magnetic disks, internal hard disks, removable disks, magneto-optical disks, Compact Disc Read-Only Memory (CD-ROM), any other volatile or non-volatile memory, or a combination thereof.

Memory module 112 serves to store machine-executable instructions, data, and various programs, such as an operating system 120, a database 122 and a database management system (DBMS) 123 for implementing the techniques described herein, all of which may be processed by CPU 114. As such, the computer system 106 is a general-purpose computer system that becomes a specific purpose computer system when executing the machine-executable instructions. Alternatively, the various techniques described herein may be implemented as part of a software product, which is executed via the operating system 120. Each computer program may be implemented in a high-level procedural or object-oriented programming language (e.g., C, C++, Java, etc.), or in assembly or machine language if desired. The language may be a compiled or interpreted language. The machine-executable instructions are not intended to be limited to any particular programming language and implementation thereof. It will be appreciated that a variety of programming languages and coding thereof may be used to implement the teachings of the disclosure contained herein.

In one implementation, database 122 comprises at least one database table. The database table may be stored in the random access memory or the mass storage unit. In addition, one or more index tables may be provided to enhance the speed of accessing the database table. The database table may include N+1 columns for N number of data fields, with one column used for storing keys. Each row constitutes a record, and the key in that row may be used to access the respective record from the database table. The index table may relate the data values of at least one data field to the keys of the records that contain the given data value for the data field.

The database table may be column-oriented or row-oriented. A column-oriented database table is stored by serializing data values of a column, then the data values of the next column, and so forth. Conversely, a row-oriented database table is stored as sections of rows of data. The organization of the database table typically affects the type of query plan that is generated or selected to optimize performance.

The DBMS 123 comprises a set of programs to define, administer and process the database 122. A user at the client computer 150 may interact with a user interface 152 to communicate with the database 122 via the DBMS 123. The user and the DBMS 123 may exchange transaction messages through the user interface 152. For example, the user may transmit a query to the DBMS 123, and the DBMS 123 may process the query using the database 122. When the transaction is completed, the DBMS 123 sends the results to the user in the form of, for example, a results hit list.

It should be appreciated that the different components of the computer system 106 may be located on different machines. For example, the database 122 and the DBMS 123 may reside in different physical machines. It should further be appreciated that the different components of the client computer 150 may also be located in the computer system 106.

Figure 2:
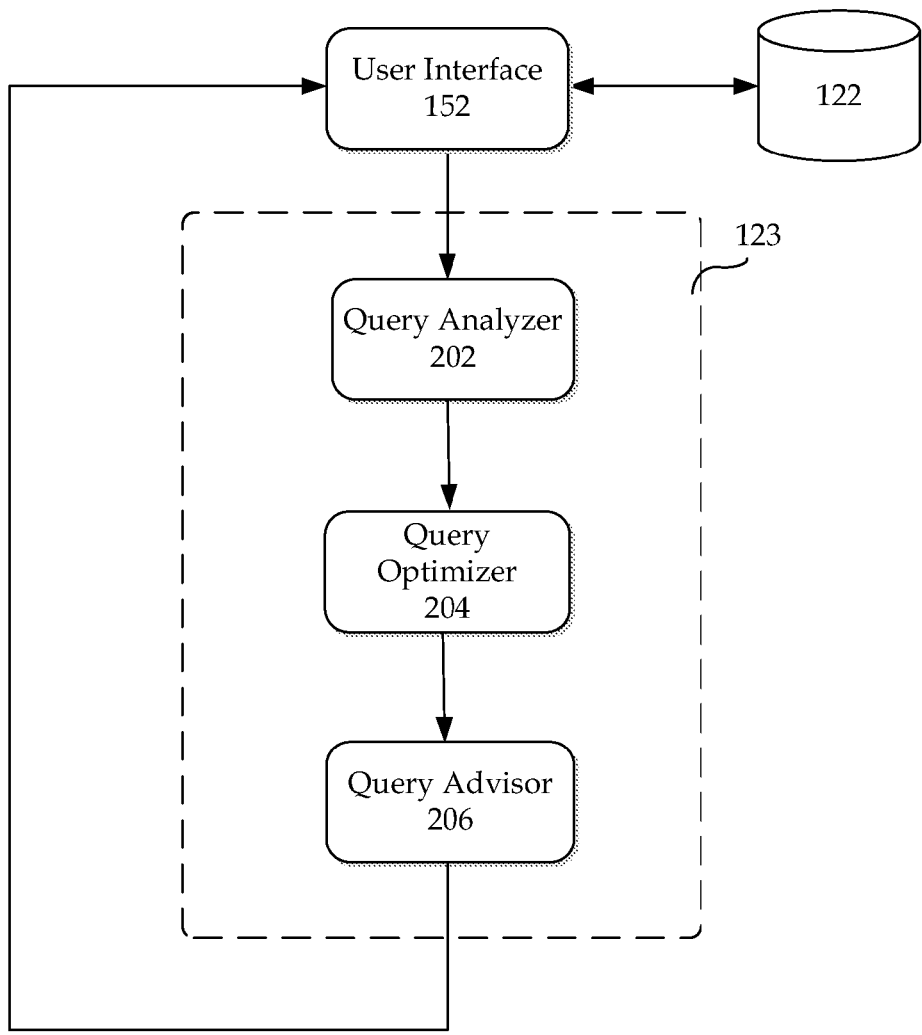
FIG. 2 is a block diagram illustrating a query flow through an exemplary database management system.

FIG. 2 is a block diagram illustrating a query flow 200 through an exemplary DBMS 123. The computer system 106 of FIG. 1 may be configured by computer program code to implement the process represented by the flow 200.

In one implementation, the DBMS 123 includes a query analyzer 202, a query optimizer 204 and a query advisor 206. The query analyzer 202 receives at least one first query from user interface 152. The first query may include a set of commands and/or clauses for accessing, modifying, appending, or otherwise manipulating data stored in the database 122, and conform to a standard syntax or query language, such as the Structured Query Language (SQL), SQLScript, or any other language. They may specify, for example, a specific location (e.g., database, table, column or row) in the database 122, search criteria that must be satisfied for a particular data record to be included in a query result, aggregation methods, sub-queries, join operations, and so forth.

The query analyzer 202 parses the text and performs a constructive analysis of the first query. The query analyzer 202 may eliminate redundant data or perform error checking, such as verifying the syntax of the first query, validating the relationships among tables, etc. In addition, the query analyzer 202 may convert the first query into a structured object, such as a binary tree data structure or any other suitable data structure. The structured object may contain, for example, sections of the query with meaningful syntax, such as populated column names, computation methods used, sorting fields, join conditions, etc.

The query optimizer 204 receives the structured object from the query analyzer 202 and automatically rewrites the first query to generate a second query. Similar to the first query, the second query may also conform to a defined query language (e.g., SQL, SQLScript). The second query results in a query plan that is most efficient for the underlying database 122. The resultant query plan may be determined, for example, based on a priori knowledge of the specific behavior and properties of the underlying database 122. In one implementation, the second query is generated by recognizing which scenario for optimization the first query belongs to, and performing the corresponding optimization operation to rewrite the first query, as will be described in more detail later. The corresponding operation may be pre-defined based on particular characteristics of the underlying database.

The query optimizer 204 passes the second query to the query advisor 206. The query advisor 206 may generate one or more advices (or comments) recommending further action by the user to yield even better performance with the second query. Such advices provide recommendations at the system, integration or database administration level, rather than the statement level. For example, the advices may provide the user with suggestions on how to modify the environment or schema to improve performance, such as removing the compression for specified columns in a particular table, etc.

The second query and/or any advices generated by the query advisor 206 may be presented to the user via the user interface 152. The user may then make any modifications as desired, and run the modified second query against the database 122 to access and manipulate the data stored therein. Unlike conventional techniques that provide the "EXPLAIN" function so that programmers can preview and monitor the query plan for performance tuning, the present framework automatically generates optimized query statements tailored to the specific characteristics or properties of the underlying database. This is achieved by providing a set of optimization functions that are pre-defined based on a priori knowledge of the specific properties of the underlying database.

Programmers who are not familiar with the underlying database are now able to generate optimized queries via the present framework easily and efficiently. This provides the added advantage of making new database products more widely accepted by the market, since expert knowledge or prior experience is not required of the user for performance tuning. When the data volume changes, all the user needs to do is to input the first query and make use of the modified second query output by the present framework, without having to manually perform a lengthy and difficult performance tuning process all over again.

Figure 3:
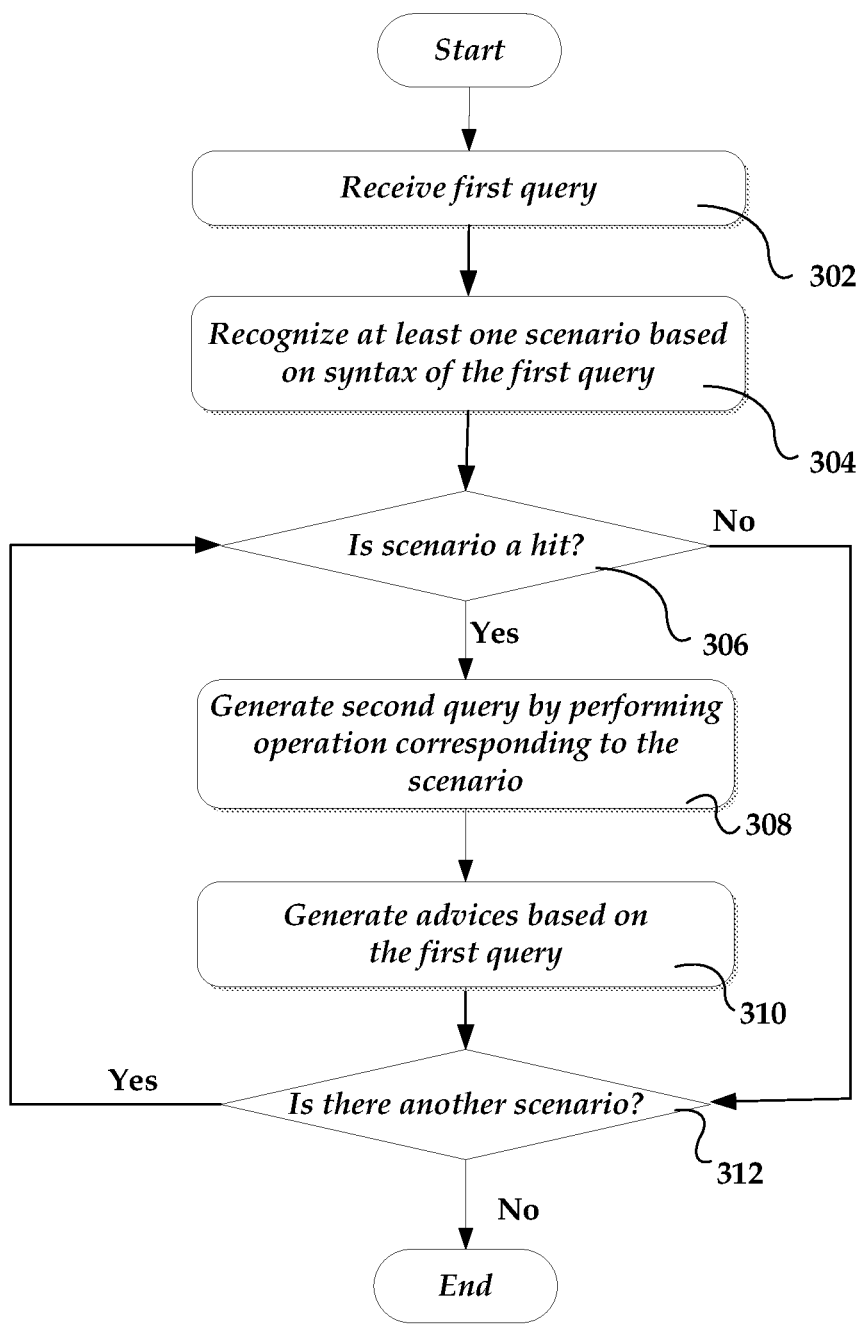
FIG. 3 shows an exemplary method for optimizing a database query.

FIG. 3 shows an exemplary method 300 for optimizing a database query. The exemplary method 300 may be implemented by the computer system 106, as previously described with reference to FIG. 1.

At 302, the query optimizer 204 receives a first query. The first query may be in the form of, for example, a structured object or any other data structure generated by the query analyzer 202. The first query may include a set of language elements, such as clauses, expressions, predicates, queries, etc. In SQL language, for example, the JOIN clause combines records from two or more tables in a database.

At 304, the query optimizer 204 analyzes the first query and automatically recognizes at least one scenario for optimization based on the syntax of the first query. A scenario refers to a type of query that may be optimized for the underlying database by re-writing. Each scenario may include sub-scenarios. In one implementation, each scenario is pre-defined based on specific syntax of the query language used. Each scenario and/or sub-scenario may be mapped to a corresponding function module or pre-defined operation for re-writing the first query.

Figure 4:
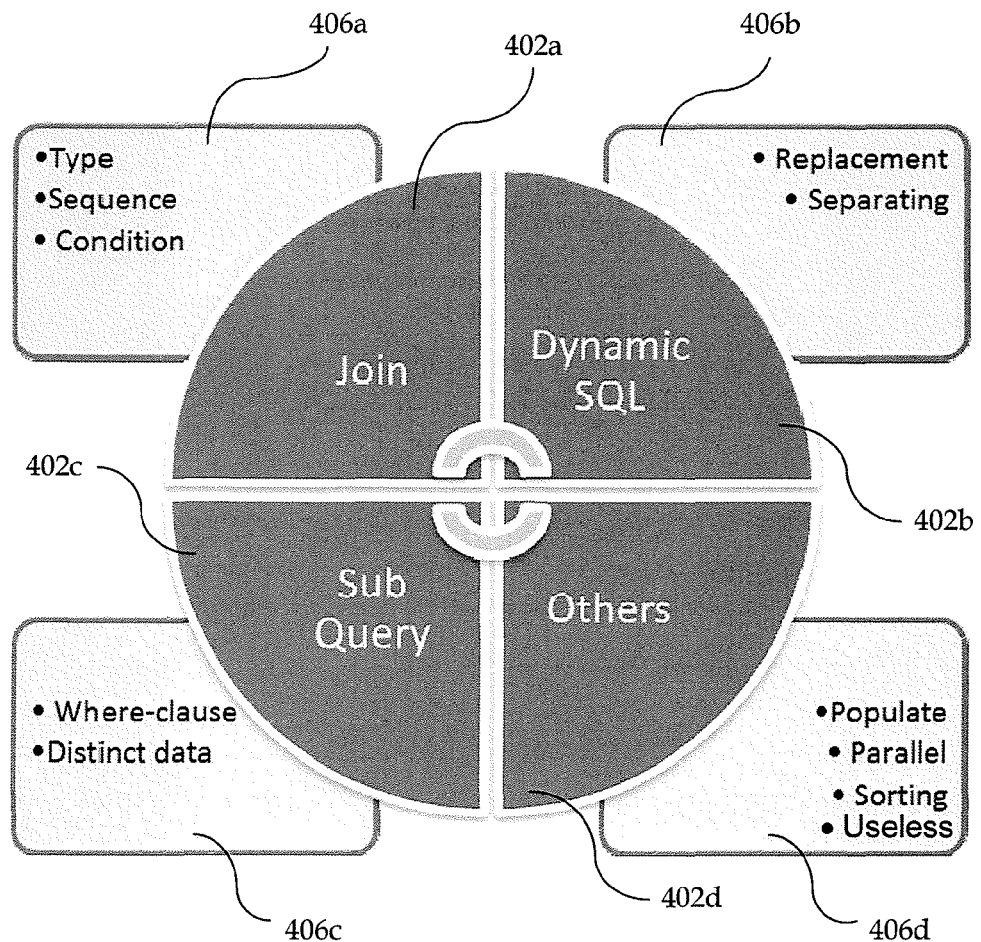
FIG. 4 shows exemplary pre-defined scenarios and sub-scenarios.

FIG. 4 shows exemplary pre-defined scenarios (402a-d) and sub-scenarios (406a-d) for optimization. It should be appreciated that the present framework is not limited to the scenarios shown, or the SQL query language. For example, more than 4 pre-defined scenarios may be provided, or other types of scenarios may be pre-defined based on the specific query language used.

As shown, the pre-defined scenarios (402a-d) may include Join, Dynamic SQL, Sub-query and Other scenarios. The pre-defined scenarios may be recognized by detecting specific syntax in the first query. For example, the "Join" scenario is recognized by detecting the JOIN clause in the first query. The "Dynamic SQL" scenario may be recognized by detecting the clause "exec( )". Additionally, the "Sub-query" scenario may be identified by detecting a SELECT clause nested inside at least one SELECT, INSERT, UPDATE, or DELETE statement, or inside another sub-query. The "Other" scenario groups various miscellaneous sub-scenarios that do not belong to the other 3 main scenarios.

Referring back to FIG. 3, at 306, the query optimizer 204 determines if the scenario is a hit. The scenario is a hit if a corresponding function module is available to rewrite and optimize the first query. If no function module is found, then the process 300 continues at 312 to the check if there is another scenario to be processed. If a corresponding function module is found, the process 300 continues at 308 to generate a second query by rewriting the first query.

Each function module implements one or more pre-defined operations to automatically generate a second query. The second query is functionally equivalent (i.e. returns same results) to the first query, but accesses or manipulates information in the underlying database in a more efficient manner (e.g., faster and less resources required). In one implementation, the function module is tailored based on a priori knowledge of particular characteristics of a specific type of database (e.g., column-oriented or row-oriented), or specific implementation of a database or database management system (e.g., SAP HANA, Sybase IQ, Microsoft SQL, etc.). Alternatively, the function module may be designed to be generally applicable to most or all types of databases or database management systems (e.g., both row and column-oriented). The user interface 152 may provide the user with an option to select whether to use database-specific function modules or generally-applicable function modules.

One implementation of the present framework provides a first function module for optimizing a first query categorized as a "Join" scenario. As shown in FIG. 4, the "Join" scenario may be further divided into exemplary sub-scenarios: Type, Sequence, Condition. It should be appreciated that other types of sub-scenarios may also be provided.

The first function module may optimize a "Type" sub-scenario query by rewriting it to change the "Join" type. There are generally four types of "Join" queries: Inner, Outer, Left and Right. An "Inner Join" query may be converted to an equivalent "Outer Join" query, or vice versa.

For example, a typical "Inner Join" query is as follows:

SELECT VBELN, POSNR FROM VBAP_S T1
   INNER JOIN VBAP T2 ON T1.MAND = T2.MANDT
   AND T1.VBELN = T2.VBELN AND T1.POSNR =
   T2.POSNR;

Such "Inner Join" query statement may be re-written as an equivalent "Left Outer Join" statement to enhance performance, as follows:

SELECT VBELN, POSNR FROM VBAP_ST1
   LEFT OUTER JOIN VBAP T2 ON T1.MAND =
   T2.MANDT AND T1.VBELN = T2.VBELN AND
   T1.POSNR = T2.POSNR;

In other instances, a "Left Outer Join" or a "Right Outer Join" may also be re-written as an equivalent "Inner Join" so as to improve the speed of database access. Other types of "Join" query statements may also be re-written to enhance database performance, depending on the specific properties of the underlying database.

A "Sequence" sub-scenario query may be optimized by re-arranging the order of "Join" statements in the query. Some databases generate different query plans if the "Join" statements are ordered differently. As such, it is desirable to re-arrange the order of "Join" statements in a particular sequence so as to optimize the performance of the underlying database.

For example, a typical query with multiple "Inner Join" statements is as follows:

SELECT A1.ERDAT,A1.AUDAT
FROM VBAK AS A1
   INNER JOIN VBAP AS B1 ON (A1.MANDT =
   B1.MANDT AND A1.VBELN = B1.VBELN)
   INNER JOIN VBUK AS A2 ON (A1.MANDT =
   A2.MANDT AND A1.VBELN = A2.VBELN)
   INNER JOIN VBUP AS B2 ON (B1.MANDT =
   B2.MANDT AND B1.VBELN = B2.VBELN AND
   B1.POSNR = B2.POSNR)

Such query may be optimized by re-ordering the "Inner Join" statements such that tables at the same business level (e.g., order level, item level, schedule line level, etc.) are placed in adjacent positions. For example, tables B1, A2, B2 (where A and B each denotes a business level) may be ordered as A2, B1, B2, as follows:

```
SELECT A1.ERDAT,A1.AUDAT
FROM VBAK AS A1
    INNER JOIN VBUK AS A2 ON (A1.MANDT =
    A2.MANDT AND A1.VBELN = A2.VBELN)
    INNER JOIN VBAP AS B1 ON (A1.MANDT =
    B1.MANDT AND A1.VBELN = B1.VBELN)
    INNER JOIN VBUP AS B2 ON (B1.MANDT =
    B2.MANDT AND B1.VBELN = B2.VBELN AND
    B1.POSNR = B2.POSNR)
```

As another example, a typical query with multiple types of "Join" statements (e.g., "Left Outer Join," "Inner Join") is as follows:

```
SELECT FIELD1,FIELD2,...FIELDN
FROM T1
    LEFT OUTER JOIN T2 ON (T1.K1 = T2.K1 AND T1.K2
    = T2.K2)
    INNER JOIN T3 ON (T1.K1 = T3.K1 AND T1.K2 =
    T3.K2)
```

Such query may be optimized by ordering the "Inner Join" statement before the "Left Outer Join" statement, as follows:

```
SELECT FIELD1, FIELD2,...FIELDN
FROM T1
    INNER JOIN T3 ON (T1.K1 = T3.K1 AND T1.K2 =
    T3.K2)
    LEFT OUTER JOIN T2 ON (T1.K1 = T2.K1 AND T1.K2
    = T2.K2)
```

A "Condition" sub-scenario query may be optimized by changing one or more conditions in the "Join" statement of the query. For example, "Circular Joins" are typically undesirable for many databases, as they cause the resulting query plan to be very inefficient. A "Circular Join" query links three or more tables together into a circuit. For example, a typical "Circular Join" query is as follows:

```
SELECT ...
FROM VBAK
    INNER JOIN VBAP ON VBAK.MANDT =
    VBAP.MANDT AND VBAK.VBELN = VBAP.VBELN
    INNER JOIN VBUP ON VBAK.MANDT =
    VBUP.MANDT AND VBAK.VBELN = VBUP.VBELN
    AND VBAP.POSNR = VBUP.POSNR
```

Such "Circular Join" queries may be re-written in a "non-circular" form by changing the conditions (e.g., "VBAK.MANDT=VBUP.MANDT" to "VBAP.MANDT=VBUP.MANDT") so as to avoid joining the tables in a circuit, as follows:

```
SELECT ...
FROM VBAK
    INNER JOIN VBAP ON VBAK.MANDT =
    VBAP.MANDT AND VBAK.VBELN = VBAP.VBELN
    INNER JOIN VBUP ON VBAP.MANDT =
    VBUP.MANDT AND VBAP.VBELN = VBUP.VBELN
    AND VBAP.POSNR = VBUP.POSNR
```

One implementation of the present framework provides a second function module for optimizing a query categorized as a "Dynamic SQL" scenario. The "Dynamic SQL" scenario may be further divided into exemplary sub-scenarios: Replacement, Separating. It should be appreciated that other types of sub-scenarios may also be provided.

The second function module may optimize a "Replacement" sub-scenario query by converting the dynamic SQL query into an equivalent non-dynamic SQL form. This feature recognizes the fact that dynamic SQL queries often run slower than non-dynamic SQL queries in certain databases.

For example, a typical dynamic SQL query may be as follows:

```
SQL1 := 'SELECT FIELD1,FIELD2,...FIELDN FROM T1 ' ||
:TMP_STR;
```

Since the condition is not very complex, such query may be re-written in non-dynamic SQL form by using "if-else" statements, as follows:

```
IF :rstart_flag = 'X' THEN
    SQL1 = SELECT FIELD1,FIELD2,...FIELDN FROM T1
    INNER JOIN T2 ON (T1.K1 = T2.K1 AND T1.K2 = T2.K2);
ELSE
    SQL1 = SELECT FIELD1,FIELD2,...FIELDN FROM T1;
END IF;
```

A "Separating" sub-scenario query is a long and/or complex SQL query that may be optimized by separating it into two or more parts to avoid performance issues in certain databases.

For example, a long dynamic SQL query may be as follows:

```
SQL1 := 'SELECT FIELD1,FIELD2...FIELDN FROM(...)AS T1 ' ||
'INNER JOIN (....) AS T2 ON (T1.K1 = T2.K1 AND T1.K2 = T2.K2)';
```

To optimize such query, the result of the first part of the dynamic SQL statement may first be saved in a global temporary column table (e.g., G_T1) or any other temporary data structure. The temporary column table may then be selected and joined in the sub-query of the second part to obtain the final result, as follows:

```
INSERT INTO G_T1 FIELD1,FIELD2...FIELDN FROM(...)AS T1;
SQL1 := 'SELECT FIELD1,FIELD2...FIELDN FROM G_T1 ' ||
'INNER JOIN (....) AS T2 ON (T1.K1 = T2.K1 AND T1.K2 = T2.K2)';
```

As yet another example, a complex dynamic SQL query with an "Order by" clause may be as follows:

```
SQL1 := 'SELECT FIELD1... FIELDN FROM (.. a very long sql
statement)' || :ORDERBY_STR
```

An "Order by" clause specifies that a SQL SELECT statement returns a result set with the rows being sorted by the values of one or more columns. Since "Order by" clauses may cause performance issues in certain databases, such query may be optimized by separating it into two or more separate parts, and including the sorting or "Order by" clause in the last part of the query. This may be achieved by, for example, first saving the data set in a temporary table (e.g., T1), and then executing an extra "Select" query statement from the saved temporary table with the "Order by" clause, as follows:

```
INSERT INTO T1 SELECT FIELD1... FIELDN FROM (.. the very long
sql statement);
SQL1 := SELECT FIELD1... FIELDN FROM T1 || :ORDERBY_STR;
```

In yet another example, a dynamic SQL query with data dependency may cause performance issues in certain databases. Such query may be optimized by separating the dependencies into two or more different store procedures. For instance, a dynamic SQL query with data dependency may include a store procedure that feeds the result of a dynamic "Select" query statement to another query statement, as follows:

```
CREATE PROCEDURE SP1 (IN P1 STRING) AS BEGIN
   SQL1 := 'SELECT FIELD1,FIELD2,FIELDN FROM T1... ';
   SQL2 := 'SELECT FIELD1,FIELD2,FIELDN FROM (' || :SQL1
   || ') INNER JOIN...';
   ...
END;
```

To optimize the query, the dynamic "Select" query statement may be re-written as a standalone store procedure (e.g., SP2), and then called to use the dynamic "Select" result, such as follows:

```
CREATE PROCEDURE SP2 (IN P1 STRING,OUT t_out TOUT) AS
BEGIN
   SQL 1 := 'SELECT FIELD1,FIELD2,FIELDN FROM T1...';
   DELETE FROM T1;
   EXEC(:SQL1);
   t_out = SELECT * FROM T1;
END;
CREATE PROCEDURE SP1 (IN P1 STRING) AS BEGIN
   CALL SP2(:P1,t_out1);
   SQL2 := 'SELECT FIELD1,FIELD2,FIELDN FROM (' || :t_out1
   || ') INNER JOIN...';
   ...
END;
```

One implementation of the present framework provides a third function module for optimizing a first query categorized as a "Sub-query" scenario. The "Sub-query" scenario may be further divided into exemplary sub-scenarios: Where-clause, Distinct data. It should be appreciated that other types of sub-scenarios may also be provided.

A "Where-clause" sub-scenario query includes a "Where" clause inside or outside a sub-query statement. Such query may be optimized by re-writing it such that the "Where" clause is moved either out of or into the sub-query statement.

More particularly, in cases where the sub-query statement is long and complex, query execution time may be reduced by moving the "Where" clause out of the sub-query statement and into the main query body. In addition, any condition with high complexity but low filterability (i.e. does not significantly reduce the results returned by query) may also be moved out of the sub-query statement.

For instance, a typical "Where-clause" sub-scenario query may be as follows:

```
SELECT field1...fieldn from (...)AS VBAP
INNER JOIN
   ( SELECT DISTINCT MANDT, VBELN, POSNR, ETTYP,
   J_3AABGRU
   FROM VBEP
   INNER JOIN (SELECT DISTINCT ETTYP FROM TVEP
   WHERE ATPPR <> " AND BEDSD <> " AND PSTYP <> '5') AS
```

-continued

```
T ON (T.ETTYP = VBEP.ETTYP)
) AS VBEP ON VBEP.MANDT = VBAP.MANDT AND
VBEP.VBELN = VBAP.VBELN AND VBAP.POSNR =
VBEP.POSNR
```

The sub-query statement may be shortened by moving out the "Where" clause condition out of the sub-query statement and into the main query body, such as follows:

```
SELECT field1...fieldn from (...)AS VBAP
INNER JOIN
   ( SELECT DISTINCT MANDT, VBELN, POSNR, ETTYP,
   J_3AABGRU
   FROM VBEP
   ) AS VBEP ON VBEP.MANDT = VBAP.MANDT AND
   VBEP.VBELN = VBAP.VBELN AND VBAP.POSNR =
   VBEP.POSNR
   ...
   WHERE VBEP.ETTYP IN ( SELECT DISTINCT ETTYP
   FROM TVEP WHERE ATPPR <> " AND BEDSD <> "
   AND PSTYP <> '5')
```

In cases where the table used in the sub-query statement is large and the "Where" clause condition significantly filters out data rows, the query may be optimized by moving the "Where" clause condition from the main query body into the sub-query statement. For example, a typical "Where-clause" sub-scenario query may be as follows:

```
SELECT VBAP.VBELN, .. .. ..
FROM VBAP
LEFT OUTER JOIN VBKD ON VBAP.VBELN = VBKD.VBELN AND
VBAP.POSNR = VBKD.POSNR
   INNER JOIN VBAK ON (VBAK.MANDT = VBAP.MANDT
   AND VBAK.VBELN = VBAP.VBELN)
   INNER JOIN VBUK ON VBUK.VBELN = VBAP.VBELN AND
   VBUK.MANDT = VBAP.MANDT
WHERE
   VBAP.MATNR IN (SELECT MATNRFROM "/ARO/MATNR"
   WHERE RUNID = :runId )AND WERKS IN (SELECT
   WERKSFROM "/ARO/WERKS" WHERE RUNID = :runId )
```

Such query may be optimized by placing the "Where" clause condition in the main query, instead of the sub-query statement, as follows:

```
SELECT VBAP.VBELN,.. .. ..
FROM
(SELECT MANDT,
   VBELN,
   POSNR,
   MATNR,
   WERKS,
   LPRIO,
   VGBEL,
   ERLRE,
   ERDAT,
   J_3ARQDA,
   VGTYP,
   ERZET,
   BEDAE,
   SOBKZ,
   VBAP.J_3ACADA,
   VBAP.J_4KRCAT,
   VBAP.MATKL,
   VB AP.MVGR1
FROM VBAP
WHERE MATNR IN (SELECT MATNRFROM
"/ARO/MATNR"WHERE RUNID = :runId )AND WERKS IN
(SELECT WERKSFROM "/ARO/WERKS"WHERE RUNID = :runId
```

```
))AS VBAP
LEFT OUTER JOIN VBKD ON VBAP.VBELN = VBKD.VBELN AND
VBAP.POSNR = VBKD.POSNR
INNER JOIN VBAK ON (VBAK.MANDT = VBAP.MANDT AND
VBAK.VBELN = VBAP.VBELN)
INNER JOIN VBUK ON VBUK.VBELN = VBAP.VBELN AND
VBUK.MANDT = VBAP.MANDT
```

A "Distinct data" sub-scenario query is one that may be optimized by adding the "DISTINCT" keyword. For example, an exemplary "Where-clause" sub-scenario query may include an "IN" operator in a "Where" clause, with the values of the "IN" operator returned by a sub-query. The populated sub-query data may contain duplicated rows. To avoid duplicated values returned by the sub-query, it may be re-written to include the "DISTINCT" keyword in the "Select" statement.

For example, a typical "Where-clause" sub-scenario query may be as follows:

```
SELECT FIELD1,FIELD2 FROM T1 WHERE T1.FIELD3 IN
(SELECT FIELD3 FROM T2)
```

Such query may be re-written by using the "DISTINCT" key word in the "Select" statement of the sub-query, as follows:

```
SELECT FIELD1,FIELD2 FROM T1 WHERE T1.FIELD3 IN
(SELECT DISTINCT FIELD3 FROM T2)
```

One implementation of the present framework provides a fourth function module for optimizing a query categorized as an "Others" scenario. The "Others" scenario may be further divided into exemplary sub-scenarios: Populate, Parallel, Sorting, Useless. It should be appreciated that other types of sub-scenarios may also be provided.

The fourth function module may optimize a "Populate" sub-scenario query by using "SELECT [the fields needed]" instead of "SELECT *". This is to avoid populating unnecessary fields or columns. For example, a typical "Populate" sub-scenario query may be as follows:
SELECT * FROM T1;
Such query may be optimized by rewriting it as follows:
SELECT FIELD1,FIELD2 FROM T1;

A "Parallel" sub-scenario query may be optimized by re-writing it to employ parallel computation. For example, some databases (e.g., SAP HANA) provide a function "CE_UNION_ALL" that triggers parallel computation. In order to improve performance, a query that includes the "UNION ALL" function may be rewritten to replace the "UNION ALL" function with the "CE_UNION_ALL" function.

For instance, a typical "Parallel" sub-scenario query may be as follows:

```
SELECT FIELD1,FIELD2...FIELDN FROM (...)AS T1
UNION ALL SELECT FIELD1,FIELD2...FIELDN FROM (...) AS T2
```

Such query may be optimized by separating the entire "UNION" statement into independent components, and using the "CE_UNION_ALL" function to merge the components, as follows:

```
T1 = SELECT FIELD1,FIELD2...FIELDN FROM (...)AS T1;
T2 = SELECT FIELD1,FIELD2...FIELDN FROM (...) AS T2;
T3 = CE_UNION_ALL(:T1,:T2);
```

A "Sorting" sub-scenario query includes an "Order by" clause that is used to order the data sets retrieved from the database. The performance of "Order by" is not very efficient in certain databases, particularly with complex query logic or multiple "Order by" clauses in one long query. Such query may be optimized by rewriting it to either minimizing or avoiding the use of "Order by" if possible.

For instance, a typical "Sorting" sub-scenario query may be as follows:

```
SELECT VBAP.VBELN, VBAP.POSNR FROM
(SELECT VBELN FROM VBAK WHERE MATNR IN (....) AND
EDATU ..... ORDER BY VBELN) AS VBAK
INNER JOIN VBAP ON VBAK.VBELN = VBAP.VBELN
ORDER BY VBELN, POSRN
```

Since the use of "Order by" is inevitable in this case, the query may be optimized by placing the "Order by" clause outside the sub-query statement, as follows:

```
SELECT VBAP.VBELN, VBAP.POSNR FROM
(SELECT VBELN FROM VBAK WHERE MATNR IN (....) AND
EDATU ..... ) AS VBAK
INNER JOIN VBAP ON VBAK.VBELN = VBAP.VBELN
ORDER BY VBELN, POSRN
```

A "Useless" sub-scenario query may be optimized by rearranging any "useless" criteria. A "useless" criteria is one that does not substantially reduce the populated data size of the query result. For example, a typical "Useless" sub-scenario query may be as follows:

```
SELECT T1.* FROM
(
select MANDT, VBELN, KUNNR FROM VBAK WHERE KUNNR
NOT IN (//LONG LIST HERE)
) T1
INNER JOIN VBAP T2 ON T1.MANDT = T2.MANDT AND
T1.VBELN = T2.VBELN
```

To optimize such query, the "useless" criteria may be removed from the sub-query statement and into the outermost body of the query, as follows:

```
SELECT T1.* FROM
(
select MANDT, VBELN, KUNNR FROM VBAK
) T1
INNER JOIN VBAP T2 ON T1.MANDT = T2.MANDT AND
T1.VBELN = T2.VBELN
WHERE KUNNR NOT IN (//LONG LIST HERE)
```

Referring back to FIG. 3, at 310, the query advisor 206 generates one or more advices based on the first query. Unlike the query optimizer 204, the query advisor 206 does not rewrite the query. Instead, it generates one or more advices that recommend changes that can be made by the user so as to improve database performance.

For instance, an SQL statement that is wrapped by a store procedure may run slower than a pure (or non-procedural) SQL statement because it results in a less efficient query plan and/or triggers lower memory allocation. In such situation, the query advisor 206 may generate an advice to suggest directly implementing the SQL statement using a programming language, such as Advanced Business Application Programming (ABAP) or JAVA, rather than writing the logic as an SQL store procedure. An Open Database Connectivity (ODBC) or Java Database Connectivity (JDBC) connection may then be used to call the procedure.

In another example, the query advisor 206 may generate an advice in situations where a large volume of data is inserted in a data structure. For instance, it may recommend inserting the data into a global temporary column table instead of a local column table. This has been found to be much faster, and avoids the need of session management and data conflict, particularly in multiple processing cases. It should be noted that a global temporary row table or other data structure may also be used.

An exemplary global temporary column table may be created as follows:

```
CREATE GLOBAL TEMPORARY COLUMN TABLE
"ARO"."E_OUT_XTAB"
(
   VBELN NVARCHAR(12),
   POSNR NVARCHAR(6),
   ERDAT NVARCHAR(8),
   LPRIO NVARCHAR(2),
   MATNR NVARCHAR(18),
   WERKS NVARCHAR(4),
   CSORT NVARCHAR(1),
   ERZET NVARCHAR(6),
   VGBEL NVARCHAR(10)
);
```

In yet another example, the query advisor 206 may generate an advice recommending the removal of field compression, particularly when building a very complex query statement. Field compression may reduce memory usage, but it impairs performance particularly in a long complex query with many sub-query statements. The compression of a specified field may be manually removed if it is frequently used in the query as a filter or index. For example, compression may be switched off using the following code:

```
ALTER TABLE <table name> WITH
   PARAMETERS('AUTO_OPTIMIZE_COMPRESSION'='OFF')
```

In yet another example, the query advisor 206 may generate an advice recommending the use of a particular statement provided by the underlying database to optimize inserts or deletes. For example, SAP HANA provides a "MERGE DELTA" statement that merges the column store table delta part to its main part. This is particularly useful for a table that is changed frequently. For instance, a typical query may be as follows:

```
DELETE FROM EX_OUT_XTAB;
INSERT INTO EX_OUT_XTAB
SELECT ......
```

The query advisor 206 may generate an advice suggesting amending the query by merging the delta index before a new round of inserting, such as follows:

```
DELETE FROM EX_OUT_XTAB;
UPDATE EX_OUT_XTAB MERGE DELTA INDEX;
INSERT INTO EX_OUT_XTAB
SELECT ......
```

Figure 5:
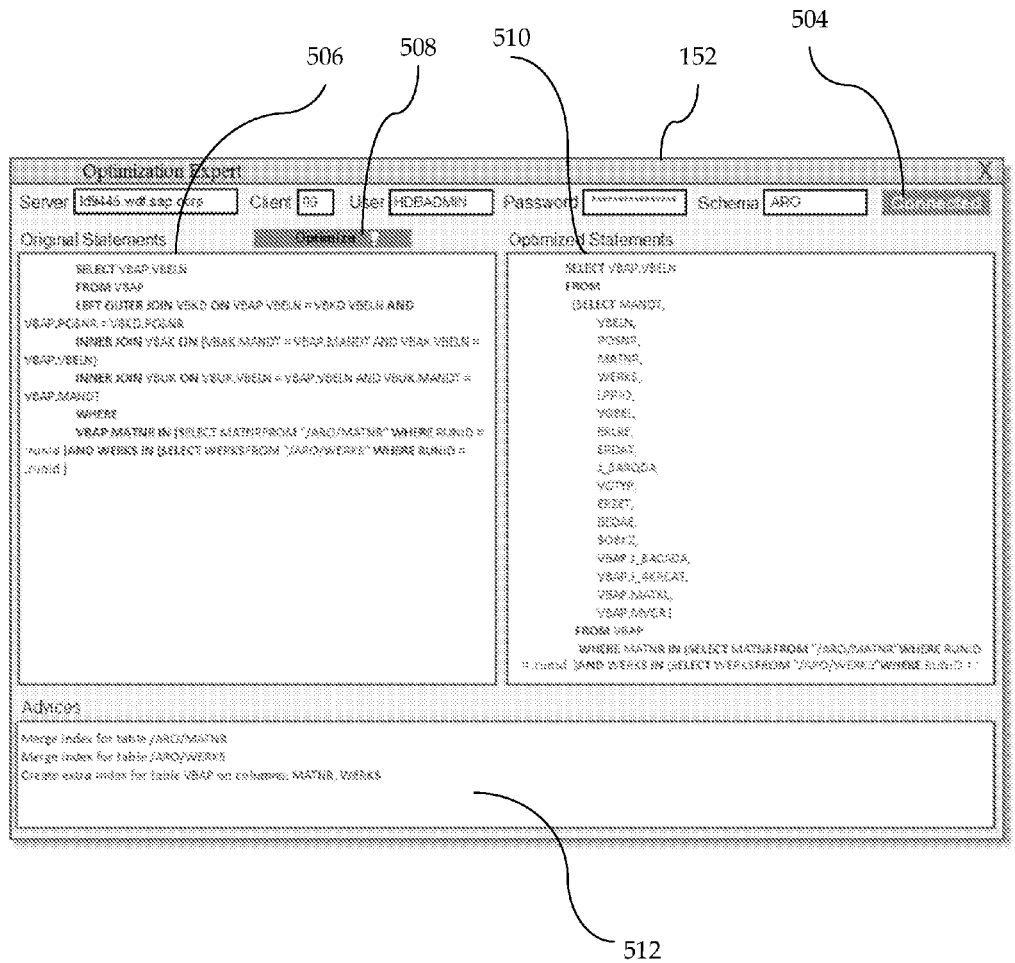
FIG. 5 shows an exemplary user interface.

Once the second query and/or advices are generated based on the first query, they may be displayed to the user for evaluation via the user interface 152 (e.g., a graphical user interface implemented on a display device). FIG. 5 shows an exemplary user interface 152. A user may interact with the user interface 152 to communicate with the computer system 106 to perform performance tuning. In one implementation, the user specifies configuration information (e.g., server, client, user and schema information) and connects to the computer system 106 by clicking the button 504.

When the configuration is successful, the user may input the original query statements in the text box 506, and click the button 508 to initiate the optimization. After the computer system 106 completes the performance tuning, the optimized query statements be displayed in the text box 510. Additional advices may be displayed in the text box 512. The user may then accept, reject or modify the optimized query statements based on the advices, and execute the query to retrieve or manipulate data from the underlying database 122.

Although the one or more above-described implementations have been described in language specific to structural features and/or methodological steps, it is to be understood that other implementations may be practiced without the specific features or steps described. Rather, the specific features and steps are disclosed as preferred forms of one or more implementations.

The invention claimed is:

1. A method of database query optimization, comprising:
   (a) receiving a first query via a user interface presented at an output device;
   (b) automatically recognizing, by a computer coupled to the output device, at least one scenario for optimization by detecting specific syntax in the first query;
   (c) automatically generating, by the computer, a second query by re-writing the first query using a pre-defined operation corresponding to the recognized scenario, wherein the pre-defined operation includes re-ordering "Inner Join" statements in the first query by placing tables at a same business level in adjacent positions; and
   (d) presenting, via the user interface, the second query for user evaluation.

2. The method of claim 1 wherein the first and second queries comprise Structured Query Language (SQL) queries.

3. The method of claim 1 wherein the first query comprises a structured object generated by a query analyzer.

4. The method of claim 1 wherein the scenario comprises a "Join" scenario.

5. The method of claim 4 wherein the pre-defined operation comprises changing a "Join" type of the first query.

6. The method of claim 5 wherein changing the "Join" type comprises converting the first query from an "Inner Join" form to an equivalent "Outer Join" form.

7. The method of claim 5 wherein changing the "Join" type comprises converting the first query from an "Outer Join" form to an equivalent "Inner Join" form.

8. The method of claim 4 wherein the pre-defined operation comprises re-arranging "Join" statements in the first query.

9. The method of claim 8 wherein re-arranging the "Join" statements comprises ordering "Inner Join" statements before "Left Outer Join" statements.

10. The method of claim 4 wherein the pre-defined operation comprises changing one or more conditions in a "Join" statement.

11. The method of claim 4 wherein the pre-defined operation comprises converting the first query from a circular form to an equivalent non-circular form.

12. The method of claim 1 wherein the scenario comprises a "Dynamic SQL" scenario.

13. The method of claim 12 wherein the pre-defined operation comprises converting the first query from a dynamic SQL form to an equivalent non-dynamic SQL form.

14. The method of claim 12 wherein the pre-defined operation comprises separating the first query into two or more parts using a temporary data structure.

15. The method of claim 12 wherein the pre-defined operation comprises separating data dependencies in the first query into two or more different store procedures.

16. The method of claim 1 wherein the scenario comprises a "Sub-query" scenario.

17. The method of claim 16 wherein the pre-defined operation comprises moving a "Where" clause out of or into a sub-query statement of the first query.

18. The method of claim 1 further comprises generating one or more advices based on the first query.

19. A non-transitory computer-readable medium having stored thereon program code, the program code executable by a computer to:

receive a first query;
automatically recognize, at least one scenario for optimization by detecting specific syntax in the first query; and
automatically generate a second query by re-writing the first query using a pre-defined operation corresponding to the recognized scenario, wherein the pre-defined operation includes re-ordering "Inner Join" statements in the first query by placing tables at a same business level in adjacent positions.

20. A system comprising:

a non-transitory memory device for storing computer readable program code; and
a processor in communication with the memory device, the processor being operative with the computer readable program code to:
receive a first query;
automatically recognize, at least one scenario for optimization by detecting specific syntax in the first query; and
automatically generate a second query by re-writing the first query using a pre-defined operation corresponding to the recognized scenario, wherein the pre-defined operation includes re-ordering "Inner Join" statements in the first query by placing tables at a same business level in adjacent positions.

* * * * *